United States Patent [19]

Powell et al.

[11] Patent Number: 5,255,509
[45] Date of Patent: Oct. 26, 1993

[54] PARTICLE BED REACTOR-POWERED TURBINE ENGINE

[75] Inventors: James R. Powell, Shoreham; Joseph A. Belisle, West Babylon, both of N.Y.

[73] Assignee: Grumman Aerospace Corporation, Bethpage, N.Y.

[21] Appl. No.: 777,928

[22] Filed: Oct. 17, 1991

[51] Int. Cl.[5] .................... F02K 11/00; G21D 5/02
[52] U.S. Cl. ................... 60/203.1; 376/381
[58] Field of Search ............ 60/203.1; 376/319, 332, 376/381, 455

[56] References Cited

U.S. PATENT DOCUMENTS 4,911,881 3/1990 DeMars .................. 376/381
4,941,158 7/1990 Bingham et al. .......... 376/332

FOREIGN PATENT DOCUMENTS 1137047 5/1957 France .................. 60/203.1

OTHER PUBLICATIONS

Nesterenko et al. *First Airborne Atomic Engines Will be Nuclear-Chemical Hybrids.* Space/Aeronautics, 1957, p. 47.

Primary Examiner—Louis J. Casaregola
Attorney, Agent, or Firm—Pollock, Vande Sande & Priddy

[57] ABSTRACT

The combustion chamber and associated fuel injection and ignition equipment of a turbine engine is removed and replaced with a particle bed reactor. The reactor has central fuel elements removed to receive a shaft therein. The shaft is connected between a turbo compressor and drive turbine. Air compressed by the compressor turbine is heated by the reactor and the heated gas passes across rotor vanes of the drive turbine, the latter powering the interconnecting shaft. Exhaust gases from the drive turbine furnish resultant thrust.

1 Claim, 2 Drawing Sheets

PARTICLE BED REACTOR-POWERED TURBINE ENGINE

FIELD OF THE INVENTION

The present invention relates to turbine engines, and more particularly to such an engine which is nuclear reactor powered.

BACKGROUND OF THE INVENTION

The range and endurance of present day aircraft are limited by the amount of expendable fuel they carry. The utilization of fossil fuels necessitates a large number of mechanical and electrical devices which decrease the overall reliability of an aircraft. These include fuel cells, fuel pumps, fuel transfer pumps, level sensors, fuel level indicators, valves and piping. Further, aircraft aerodynamics are adversely affected on account of storage requirements for fuel. Normally, fuel tanks are located in aircraft wing cavities which require thicker wings. Further, aircraft performance may vary as fuel is consumed due to a shift in an aircraft's center of gravity during flight.

Nuclear power has long been considered an alternative to fossil fuel. Further, prior approaches have involved large reactors which present problems in terms of practicability.

The present invention relies upon a prior art Particle Bed Reactor (PBR) which is a high temperature gas cooled nuclear reactor. The PBR is a compact, very efficient, high capacity heater for gases which are heated directly by fissioning particulated nuclear fuel. The nuclear fuel particles are contained in fuel elements each consisting of a porous outer pipe and a smaller diameter inner porous pipe with the particulate fuel packed in the annulus formed between the porous pipes. The gas flows radially through the outer porous pipe, over the fuel particles, then through the inner pipe into its axial channel and out of the channel to do work. The fuel elements are arranged in generally concentric circles around a central fuel element in a moderator matrix to form the reactor core. The reactor core is contained in an appropriately configured pressure vessel to form the reactor. Reactor safety is assured by insertion of safety rods when the reactor is not operating. To operate the reactor, the safety rods are withdrawn and reactor reactivity is controlled by varying the depth of the control rods within the reactor.

BRIEF DESCRIPTION OF THE PRESENT INVENTION

This invention concerns removal of the combustion chamber and associated fuel injection and ignition equipment of a conventional turbine engine and employing a PBR in its stead. The PBR would have its central fuel element or its central fuel element and the first circle of fuel elements immediately adjacent to it removed so that a shaft of suitable material such as beryllium or carbon-carbon could be inserted in its/-their stead. To this shaft would be connected the turbo compressor at the engine air intake end and the drive turbine at the exhaust end. In all other respects, the turbine engine itself would remain essentially the same.

Such a modified engine would take in atmospheric air, compress it to a suitable pressure, heat the air in the PBR and eject it through a suitable exhaust system to produce thrust. It would eliminate the need for fossil fuel cells and their associated fuel pumps, fuel transfer pumps, level sensors, fuel level indicators, valves and piping. This would result in an air vehicle having thinner wings since fossil fuel tanks are usually located in wing cavities. Another salubrious effect on the air vehicle would be the elimination of any shift in its center of gravity during flight such as is experienced by fossil fuel powered air vehicles. In an operating PBR, the fission products are retained within the fuel particles and only neutrons and gamma radiation escape from the reactor resulting in negligible weight loss of the fuel.

By proper sizing of the reactor, turbine engine, air intake and exhaust systems, thrust levels of hundred(s) to thousands of pounds can be achieved. Since the reactivity of the reactor can be controlled, any desired thrust level throughout the full power range of the engine can be attained.

The range and endurance of present-day air vehicles are limited by the amount of expendable fuel they carry. An air vehicle powered by PBR-heated air in a turbine engine will have virtually unlimited range and unlimited endurance. Such air vehicles can either be unmanned or manned. Manned vehicles will require shielding of personnel and /or cargo from neutron and gamma radiation escaping from the reactor.

Typical applications for such an engine are:
a) In unmanned vehicles such as:
  1. drones and remotely piloted vehicles for surveillance, reconnaissance, target acquisition, target designation, battle damage assessment, electronic data relay and radiation level measurement after use of atomic weapons;
  2. cruise missiles against fixed or mobile targets;
  3. decoy air vehicles to accompany friendly aircraft in military operations
b) In manned vehicles such as military, commercial and civilian aircraft assuming personnel and/or cargo are properly shielded from radiation;
c) In hypersonic vehicles;
d) In single-stage-to-orbit vehicles where the vehicles are configured to carry expendable liquefied gases such as hydrogen, nitrogen, ammonia, methane, ethane, propane, butane, ethene, propene and/or butene.

The last seven fuels listed above are hydrocarbons. Additional thrust may be obtained by burning the hydrocarbons in the heated air coming from the reactor while the vehicle is flying in the atmosphere. Out of the atmosphere, the air intakes would be closed off to reduce drag and the vehicle would proceed on its internal expendable fuel.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 1:
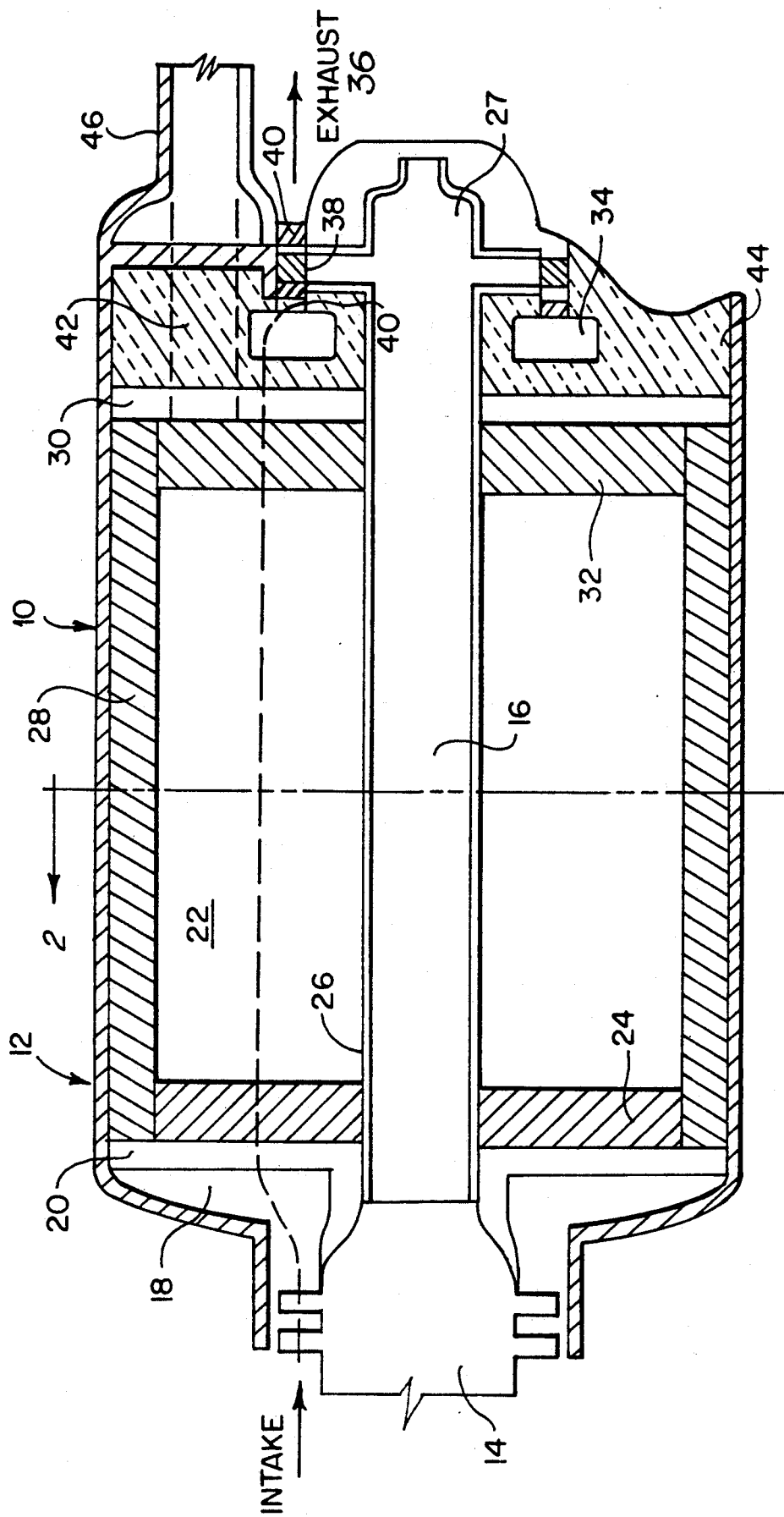
FIG. 1 is a partial sectional view of the present invention.

Referring to FIG. 1, the reactor powered turbine engine of the present invention is generally indicated by reference numeral 10. It is seen to be enclosed within a pressure vessel 12, typically fabricated from stainless steel. Viewing the engine from intake to exhaust (left to right) a conventional turbar compressor 14 compresses intake airflow as input shaft power is provided by a rotating shaft 16 axially extending through the pressure vessel 12. The shaft may be fabricated from beryllium. Compressed air is fed to an inlet plenum 18 and from there is distributed through a grid plate 20 typically made of stainless steel. The compressed air then flows through an end reflector 24 which may be made of a suitable metal hydride or high temperature plastic material. The core 22 of a reactor is centrally positioned in the pressure vessel 12 and includes a central opening 26 therein through which the shaft 16 extends. The core is circumferentially shielded by a radial reflector 28, also fabricated from metal hydride or high temperature plastic material. As will be explained in greater detail hereinafter, the compressed air flowing through the reactor core is heated to high temperatures and flows through suitable openings in an end reflector 32 which may be made of BeO. The heated gases are channeled to a drive turbine 27 located at the right end of shaft 16. Thus it will be appreciated, air compressed by turbo compressor 14 is heated by the reactor core 22 and provides the inlet hot gas for powering the drive turbine 27 which rotates, in feedback fashion, the shaft 16 that provides the input power for the turbo compressor 14. The end result is exhaust 36 which is outlet at the right end of the engine 10, the exhaust providing the necessary thrust for an aircraft.

Considering additional details of the construction existing at the right end of the engine 10, continued reference is made to FIG. 1. The heated gases emanating from the core 22 pass through an annular end plate 30 typically made from INCONEL. Axially adjacent, this end plate is a honeycomb insulator structure 44 which receives the envelope 42 of Y-shaped control/safety rods. The rods are controlled through a housing 46. These rods are shown in greater detail in FIG. 2. The honeycomb insulator structure 44 incorporates an outlet plenum 34 which directs the heated gases to rotor vanes 38 and stator vanes 40 of the drive turbine 27. Of course, as the heated gases impinge upon the rotor vanes 38, kinetic energy is developed by the drive turbine 27 which has the shaft 16 connected as an output shaft. As previously mentioned, the shaft serves as an input shaft to the turbo compressor 14.

Figure 2:
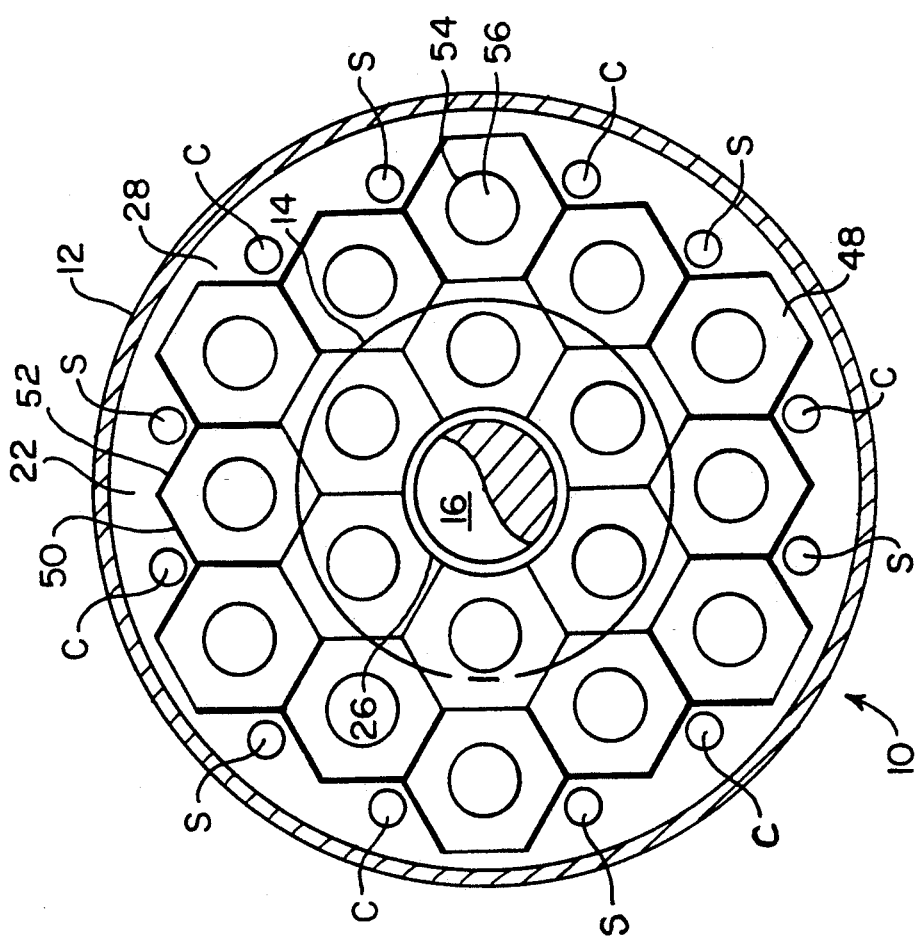
FIG. 2 is a diagrammatic sectional view taken along section line 2—2 of FIG. 1.

FIG. 2 is a diagrammatic sectional view taken along section line 2—2 of FIG. 1 and indicates the principle structural members comprising the core of a PBR. In the center is beryllium shaft 16. In order to receive the shaft 16 through the core, one or a number of centrally located components have been removed from a conventional PBR so that central opening 26 can exist to receive the shaft. The core itself includes a plurality of symmetrically positioned bores 54 extending along the length of the core 22 and positioned in mutually parallel spaced relation. These bores receive PBR fuel elements 56 to be discussed in greater detail hereinafter, in connection with FIG. 3.

FIG. 2 indicates conventional Y-shaped control rods 50 and safety rods 52. These are also peripherally indicated around the core by the letters "C" and "S" which stand for the corresponding control and safety rods respectively. FIG. 2 further indicates moderators 48 of hexagonal cross section which surround each element 56 and which may be fabricated from metal hydride or high temperature materials.

Figure 3:
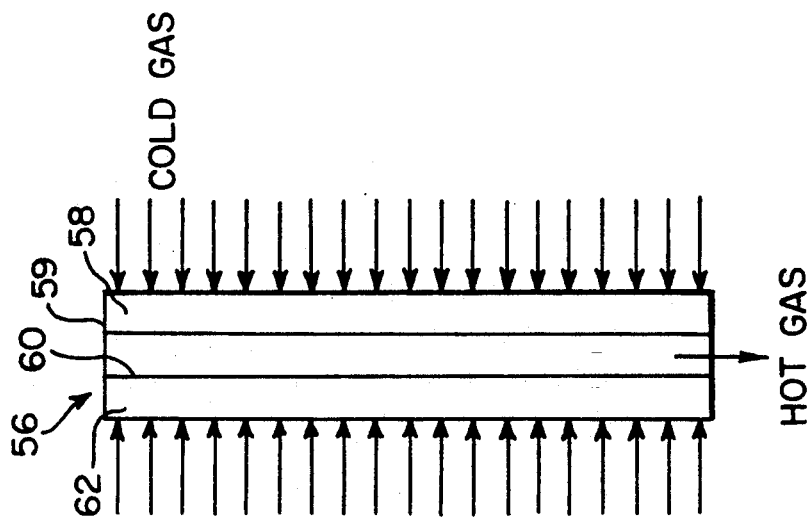
FIG. 3 is a diagrammatic view of a fuel element utilized in the particle bed reactor (PBR) of the present invention.

FIG. 3 diagrammatically illustrates a fuel element generally indicated by reference numeral 56. The figure indicates an outer porous pipe 58 and inner porous pipe 59 with particulate nuclear fuel 62 existing in the annular space between the porous pipes. The fuel particles may be uranium oxide kernels covered with ceramic layer and having an overall outer diameter equal to 0.01". An axial channel 60 is formed inside the inner pipe 59 for channeling the compressed air which has been heated after radially passing through the nuclear fuel particles. It is the heated air from the various fuel elements which is collected by the outlet plenum 34 (FIG. 1) prior to being directed against the rotor vanes 38 of the drive turbine 27 which generates rotational motion of shaft 16. Accordingly, as will be appreciated from the aforementioned description of the invention, the compressor and drive turbines are interconnected by a common shaft 16 and complete a feedback loop with the core 22 whereby compressed air 14 is heated by the core 22 so as to greatly elevate the temperature of the compressed air. After passing the heated compressed air over the drive turbine rotor vanes 38, sufficient kinetic energy exists at the exhaust 36 so as to provide significant thrust for the engine.

It should be understood that the invention is not limited to the exact details of construction shown and described herein for obvious modifications will occur to persons skilled in the art.

We claim:

1. A jet engine comprising:
   a turbo compressor for compressing air at its inlet;
   a particle bed reactor located downstream of the turbo compressor for heating the compressed air, the reactor including
   (a) a pressure vessel housing;
   (b) a core having a plurality of fuel elements located in the vessel and positioned in parallel spaced relation with an axis of the housing;
   (c) the elements having passages formed therein for admitting cold compressed air from the turbo compressor and expelling heated gas after across the elements; the fuel elements further including—
   (d) a first porous pipe;
   (e) a second porous pipe coaxially located in the first pipe and defining an annular space therebetween;
   (f) ceramic coated fuel particles packed into the annular space between the pipes;
   (g) wherein the cold compressed air radial enters the elements and is expelled axially outwardly, through the second porous pipe, as heated air;
   a plurality of channels located in the reactor for directing heated compressed air through the reactor;
   longitudinally movable control rods located between and around the fuel elements to control reactor reactivity;
   safety rods located between the fuel elements for ensuring safety when the reactor is not operating;
   a drive turbine located downstream of the channels, the heated compressed gas impinging upon rotor vanes of the drive turbine for causing rotation of a rotor;
   an exhaust of the drive turbine located downstream of the rotor to expel the heated compressed gas and generate thrust therefrom; and
   a shaft axially connected between the turbo compressor and the drive turbine rotor for translating output shaft rotation from the drive turbine to input shaft rotation of the turbo compressor.

* * * * *